United States Patent
Hamilton

(10) Patent No.: US 10,726,489 B1
(45) Date of Patent: Jul. 28, 2020

(54) SIGNALS-BASED DATA SYNDICATION AND COLLABORATION

(71) Applicant: Guidewire Software, Inc., Foster City, CA (US)

(72) Inventor: Matthew Carl Hamilton, San Bruno, CA (US)

(73) Assignee: Guidewire Software, Inc., San Mateo, CA (US)

( * ) Notice: Subject to any disclaimer, the term of this patent is extended or adjusted under 35 U.S.C. 154(b) by 837 days.

(21) Appl. No.: 14/670,219

(22) Filed: Mar. 26, 2015

(51) Int. Cl.
*G06Q 40/08* (2012.01)
*G06F 16/33* (2019.01)
*G06F 16/9535* (2019.01)

(52) U.S. Cl.
CPC ......... *G06Q 40/08* (2013.01); *G06F 16/3334* (2019.01); *G06F 16/9535* (2019.01)

(58) Field of Classification Search
CPC .... G06Q 40/08; G06Q 30/0248; G06Q 10/10; G06Q 10/00; G06Q 40/00; G06Q 10/103; G06F 19/328
See application file for complete search history.

(56) References Cited

U.S. PATENT DOCUMENTS

| | | |
|---|---|---|
| 2004/0111302 A1 | 6/2004 | Falk |
| 2006/0106651 A1* | 5/2006 | Madison ................ G06Q 10/06 705/4 |
| 2007/0233688 A1* | 10/2007 | Smolen ................. G06Q 10/10 |
| 2011/0077977 A1* | 3/2011 | Collins ................. G06Q 40/02 705/4 |
| 2012/0173289 A1* | 7/2012 | Pollard ................. G06Q 40/08 705/4 |
| 2016/0110818 A1* | 4/2016 | Shemesh ............... G06Q 40/08 705/4 |

* cited by examiner

*Primary Examiner* — Elda G Milef
(74) *Attorney, Agent, or Firm* — Van Pelt, Yi & James LLP

(57) ABSTRACT

Signals-based data syndication and collaboration is disclosed. A data store of insurance related data collected from a plurality of carriers is accessed. A pattern is identified based at least in part on data stored in the data store. The pattern is associated with a first set of insurance related data belonging to a first carrier and with a second set of insurance related data belonging to a second carrier. First and second users associated with the first and second carriers are notified, respectively, of the identified pattern. Consent from the first user to share at least a portion of the first set of insurance related data and consent from the second user to share at least a portion of the second set of insurance related data are obtained. At least a portion of the second set of insurance related data that the second user has consented to share is caused to be presented to the first user. At least a portion of the first set of insurance related data that the first user has consented to share is caused to be presented to the second user.

20 Claims, 9 Drawing Sheets

CARRIER A | Sign Out

Potential Fraud Alert!

The following filed auto claim may be fraudulent:

Claim # CARA12345ABCXYZ
Claimant Name: Shady Person
Claimant Address: 789 Fraud Street
Car Model: Fake Car
⎬ 602

The auto claim may be a part of a pattern of fraudulently filed auto claims also identified among Carrier B and Carrier C.

Would you like to collaborate with them on this case of potential fraud? ~604

● Yes  ○ No
606

FIG. 6

CARRIER A | Sign Out

Potential Fraud Alert! - Case Collaboration - Sharing of Data

Please indicate which information about the potentially fraudulent claim you would like to share with Carrier B

- Claimant Name
- Claimant Address
- Car Model

} 702

Please indicate which information about the potentially fraudulent claim you would like to share with Carrier C

- Claimant Name
- Claimant Address
- Car Model

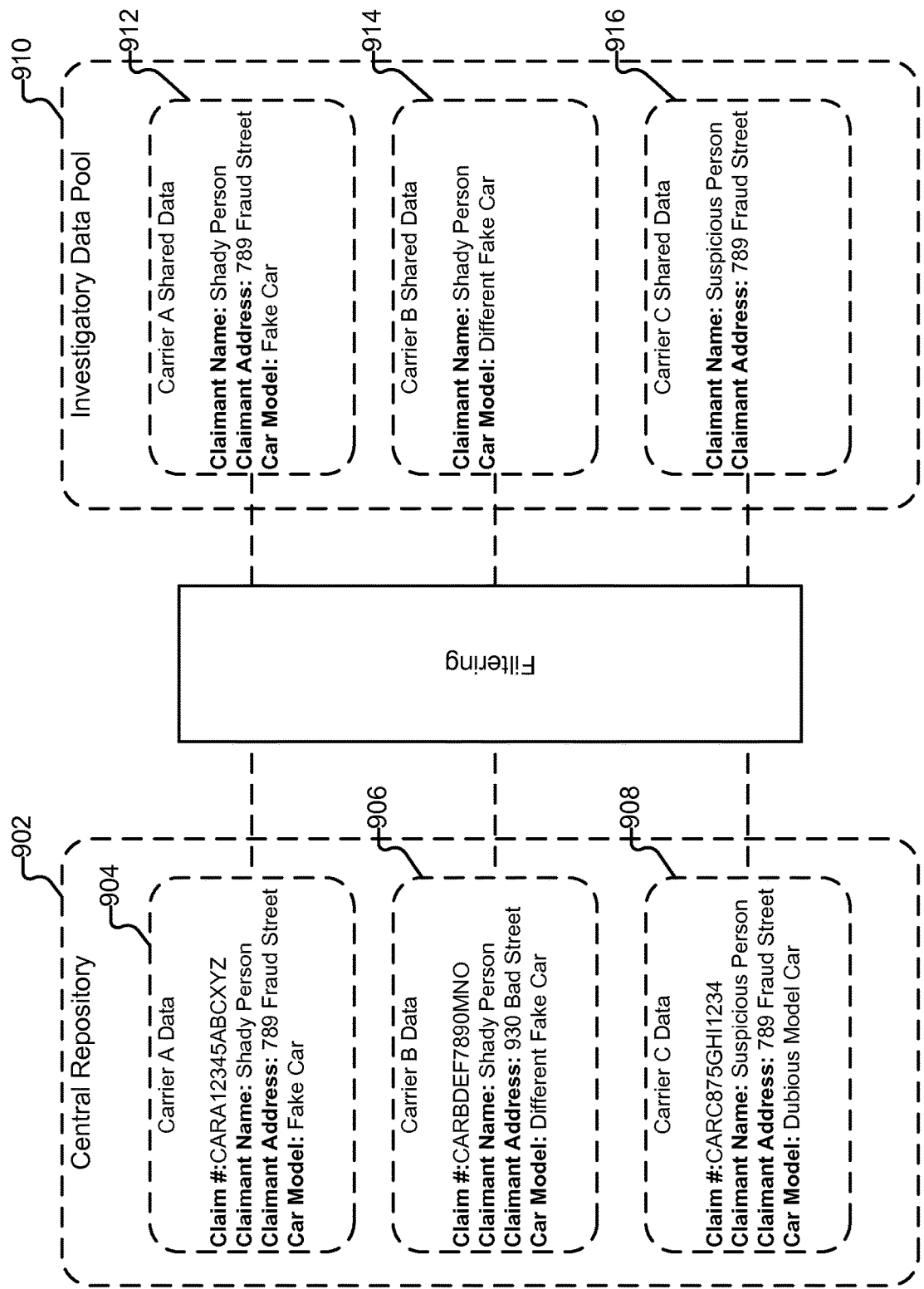

SIGNALS-BASED DATA SYNDICATION AND COLLABORATION

BACKGROUND OF THE INVENTION

It can be beneficial for insurance carriers that are competitors to cooperate with each other. Sharing data between carriers, however, can be challenging. For example, security concerns may arise when sharing data, as insurance related data may include proprietary information that is sensitive to those insured by the carrier as well as the carriers themselves. Furthermore, sharing data can be resource-intensive for carriers, and collaboration must be tightly controlled to avoid the appearance of anti-competitive collusion. Typically, insurance carriers perform analytics on their own set of data, where the analytics that are performed are tailored to the shape of a carrier's own data. Moreover, as the data for each carrier is typically non-standardized, even if the carriers agreed to collaborate and share data, attempting to adapt the analytics that are performed such that the results are consistent for all carriers involved can be inefficient and difficult.

BRIEF DESCRIPTION OF THE DRAWINGS

Various embodiments of the invention are disclosed in the following detailed description and the accompanying drawings.

FIG. 6 is a diagram illustrating an embodiment of an interface for notifying a user.

FIG. 7 is a diagram illustrating an embodiment of an interface for sharing data.

FIG. 9 is a diagram illustrating an embodiment of data structures used for collaboration.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
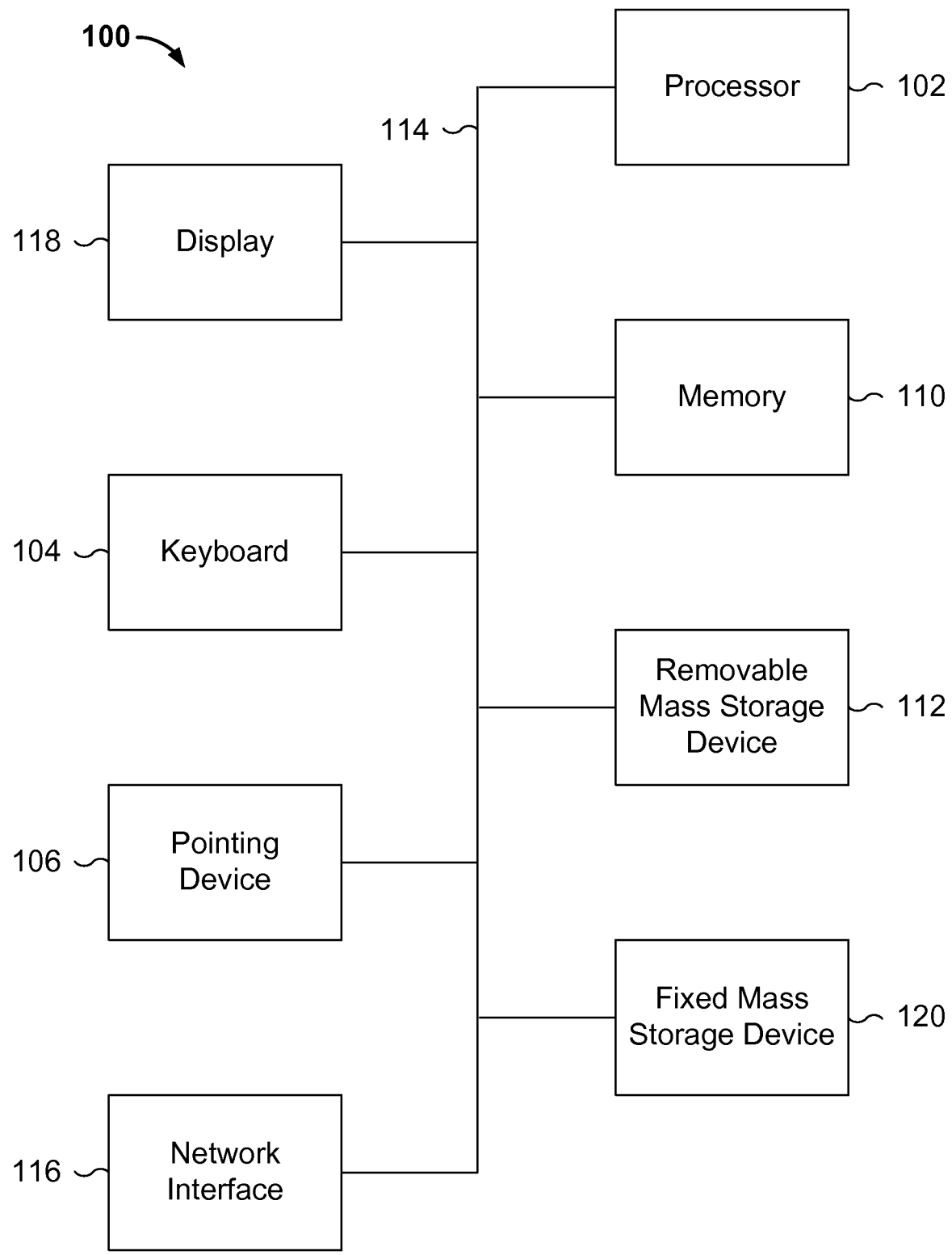
FIG. 1 is a functional diagram illustrating a programmed computer system for performing signals-based data syndication and collaboration

FIG. 1 is a functional diagram illustrating a programmed computer system for performing signals-based data syndication and collaboration in accordance with some embodiments. As will be apparent, other computer system architectures and configurations can be used to perform signals-based data syndication and collaboration. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide data syndication and collaboration system 212 described below with respect to FIG. 2 and/or executes/performs the processes described below with respect to FIG. 5.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Signals-based data syndication and collaboration is disclosed. In some embodiments, data collected from a plurality of carriers is aggregated into a unified operational data store. Processing such as analytics are performed across the multi-carrier, unified set of data to identify patterns/signals in the data. A pattern may be detected across the data sets of multiple carriers. Users (e.g., investigators) associated with the carriers whose data is implicated in the pattern are then notified of the existence of the pattern. The users associated with the respective carriers are provided options for collaborating with each other, for example, to further investigate the pattern. For example, the users can provide consent to collaborate with each other, as well as specify what information they would like to share and/or withhold from the other potential collaborators. Based on the specification, the carriers can share data and collaborate with each other on common issues such as fraud detection, without compromising the carriers' need to protect proprietary information from competitors.

Environment

Figure 2:
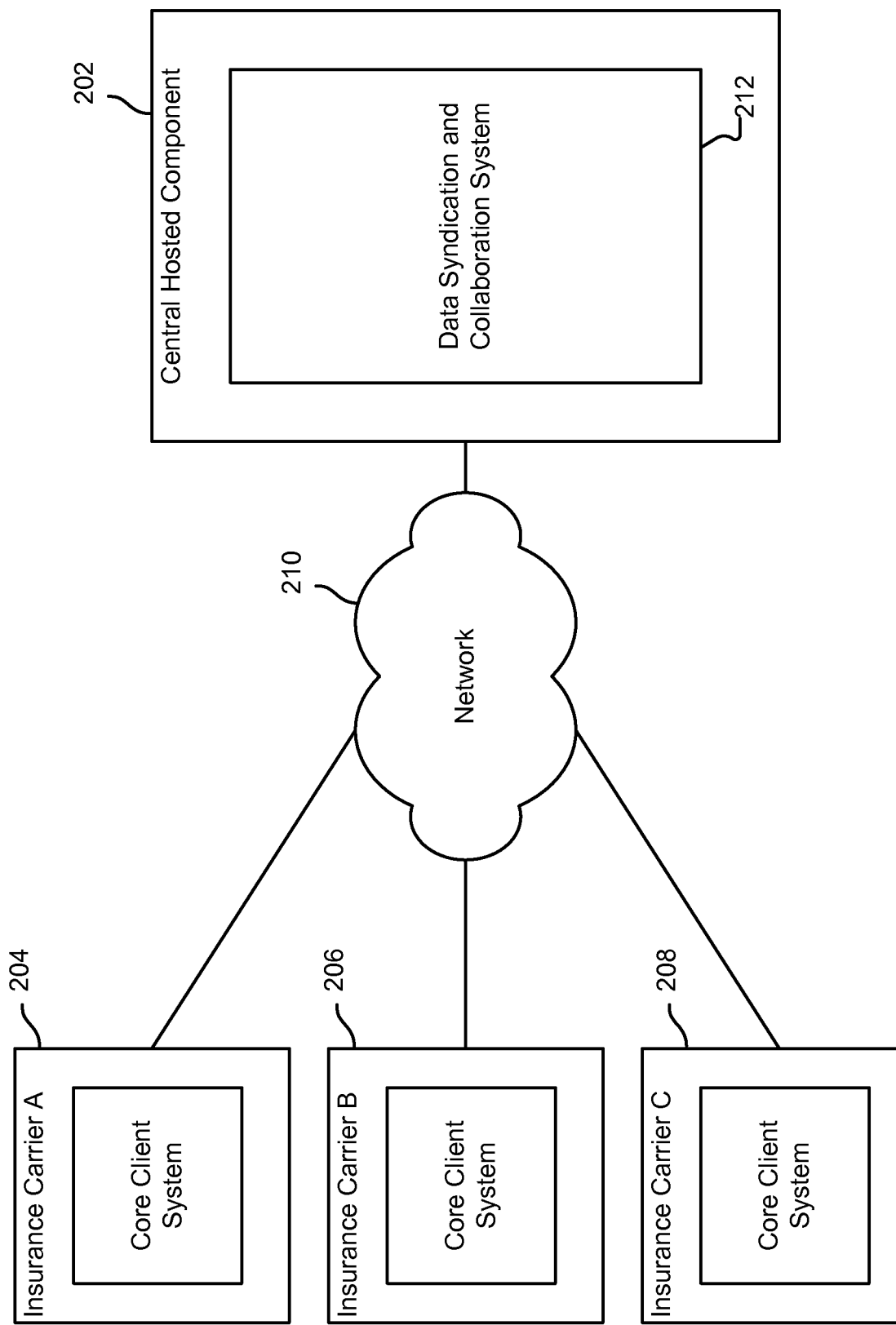
FIG. 2 is a diagram illustrating an embodiment of an environment in which signals-based data syndication and collaboration is performed.

FIG. 2 is a diagram illustrating an embodiment of an environment in which signals-based data syndication and collaboration is performed. In this example, insurance carriers A, B, and C have installed, at their respective premises/sites, instances of core insurance application systems (204, 206, and 208, respectively). The core insurance application systems installed at each of the carrier sites include insurance related software applications for policy underwriting, claim management, billing, etc., as well as local data stores for storing a carrier's insurance related data.

As shown in this example, each of the core insurance application systems communicates, via network 210, with central hosted component 202. In various embodiments, network 210 includes one or more of a wired network, a wireless network, a local area network, a wide area network, the Internet, or any other appropriate network. The central hosted component 202 is configured to provide/deliver applications and services that add or otherwise augment the functionality that is available to the carriers via the on-premise core insurance application system installations.

In the example shown, the central hosted component 202 includes data syndication and collaboration system 212. The data syndication and collaboration system is configured to perform syndication of data, where data is extracted/collected from each of the carrier's core application systems and stored/maintained by the central hosted component. For example, the core insurance application systems are configured to transmit respective sets of data to the data syndication and collaboration system, which is configured to aggregate the collected data into a single unified community data store. The collected data can then be further processed in aggregate, as a whole. The processing can include performing analytics across the multi-carrier data set. This can include identifying any signals or patterns in the multi-carrier data set that are indicative of some type of activity that has occurred across multiple carriers, using techniques such as machine learning. In some embodiments, a signal is a pattern identified in data that is indicative of a type of activity (e.g., fraudulent activity). For example, particular sets/pieces of insurance related data that together are determined to have characteristics, attributes, or markers indicative of a pattern of a particular type of activity can be identified across multiple carriers' data sets.

For example, data that is found to be duplicated across a number of carriers' data can be determined as a potential signal of suspicious activity. As one example, if a vehicle identification number (VIN) is found to be duplicated across a number of carriers' on-premise systems, this duplication of data can be interpreted as a potential signal of multiple claims submitted fraudulently to these carriers. As another example, a cell phone number duplicated across carriers' data sets, but with different names associated with the number, could be indicative of a fraudulent claim being filed with aliases. Further examples of patterns/signals will be described in more detail below.

The patterns that are identified may extend across the data of multiple carriers, or may include similar patterns that are determined to be replicated in the data sets across multiple carriers. For signals of interest that are detected across multiple carriers, the impacted/affected carriers may wish to work together to investigate any identified signals. The system is configured to facilitate and manage collaboration and data sharing among users at the different carrier sites who may wish to collaborate with each other.

As one example, the data syndication and collaboration system can be used to identify patterns indicative of potential fraudulent claim activity that have occurred at multiple carriers. Suppose, for example, that insurance related claim data has been collected from each of the on-premise installations for carriers A, B, and C and stored in a multi-carrier data set at the central host component. In analyzing the data across carriers A, B, and C, the data syndication and collaboration system determines that three auto insurance claims, filed, respectively, at each of carriers A, B, and C form a likely pattern of insurance fraud, because the claims are very similar, indicating that the same person may be attempting to file the same claim at the three different carriers. For example, it may be detected by the data syndication and collaboration system that the three auto insurance claims have common characteristics and markers, in that while each claim is associated with a different social security number for the entity filing the claim, the same cell phone number has been listed in each of the claims. Additionally, it may be determined that the three claims follow a similar pattern in that the incidents on the claims involve the same type of vehicle in approximately the same geographical region. Thus, by evaluating the insurance claim data across carriers A, B, and C, a pattern has emerged/has been identified in which it appears that the same person (associated with the same cell phone number on file with the carriers) is attempting insurance fraud by filing claims for the same incident (as indicated by similar makes/models and geographic incident locations in the claim data across the carriers) multiple times at the different carriers. As shown in this example, the pattern would otherwise have not been identifiable if the carrier data collected from all three carriers was not evaluated in aggregate. For example, without knowledge of carrier B's and C's data, investigators at carrier A would be unable to determine from an analysis of their own proprietary data that a claim has actually been filed multiple times with other carriers.

In response to identifying the pattern, the data syndication and collaboration system notifies investigators working for the affected carriers of the potentially fraudulent activity. For example, an investigator working at carrier A is sent a notification that includes a description of the potentially fraudulent activity, as well as information associated with the potentially fraudulent claim filed with carrier A. The investigator for carrier A is also notified that claims similar to the identified claim appear to have been filed with other carriers, but certain details of those claims are withheld so that sensitive information proprietary to carriers B and C is not disclosed to carrier A.

As a case of potential fraud that affects multiple carriers has been identified, the investigators are asked whether they would like to collaborate with each other to further investigate the identified fraud signal. If the investigators agree to collaborate with each other, then the data syndication and collaboration system provides options for configuring the collaboration (e.g., via a user-interface based collaboration tool hosted by the system). Collaboration configuration can include specifying, for each investigator/carrier, what information (which may include sensitive information that is proprietary to each carrier) they consent to share with the other investigators (or wish to withhold/shield). As fraudulent auto claims are of interest for this case, example fields that can be shared include the name of the claimant, the address of the claimant, and the car model involved in the claims. Using the collaboration tool, the investigator at carrier A can indicate that they consent to share all of the fields with investigators at carriers B and C. However, the investigator at carrier B only consents to share the claimant name and car model, while the investigator at carrier C only consents to share the claimant name and address. Thus, the system facilitates case management by allowing investigators to control what information they consent to share with the other parties and/or what information is shielded from the other parties involved.

In the above example, signal/pattern identification and collaboration with respect to fraud detected among multiple insurance carriers is described. However, the data syndication, analytics, and collaboration techniques described herein can be used to facilitate collaboration for other types of signals that are detected from data syndicated from multiple customers/clients/carriers. Further details regarding data extraction, data syndication, multi-carrier data set analytics, and collaboration case management will be described in further detail below.

On-Premise Client Installation

Figure 3:
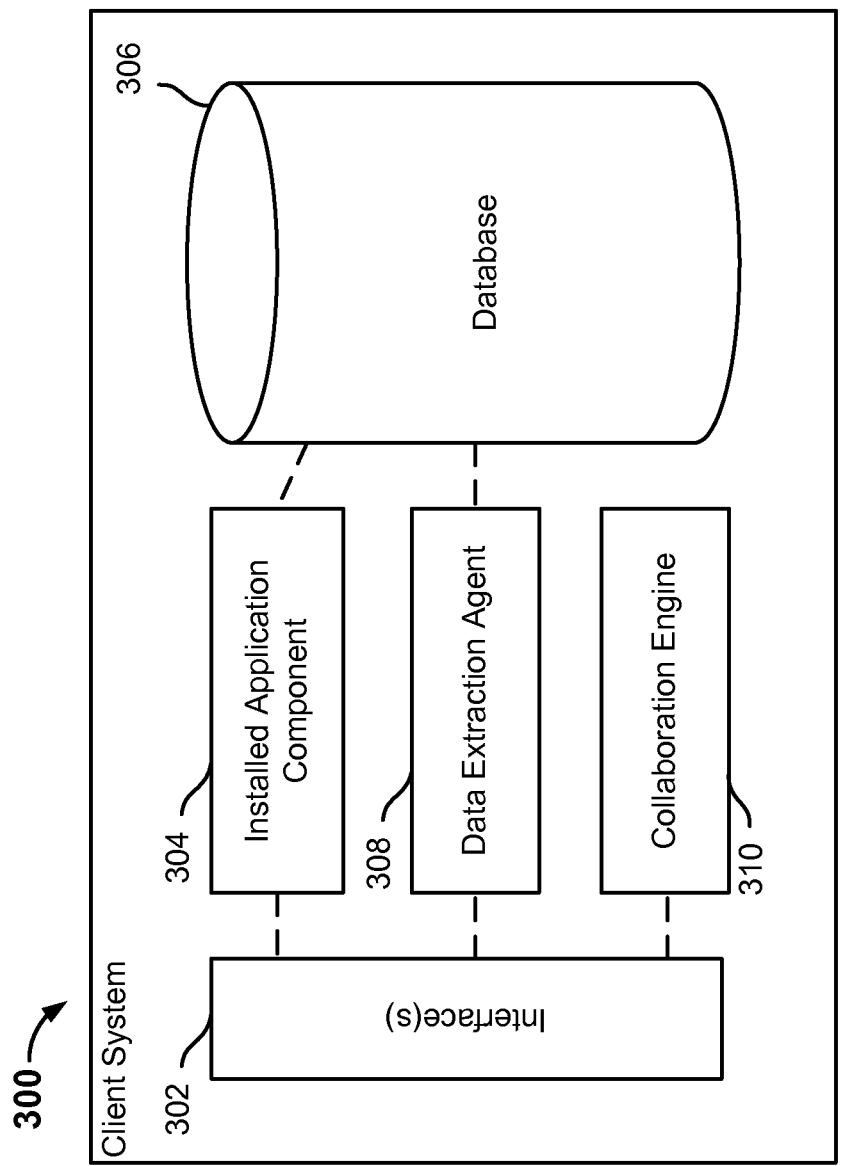
FIG. 3 is a block diagram illustrating an embodiment of a client system.

FIG. 3 is a block diagram illustrating an embodiment of a client system. In some embodiments, client system 300 is an example of installed application components/client systems at company sites/premises 204-208 of FIG. 2. In the example shown, client system 300 includes interface(s) 302, installed application component 304, database 306, data extraction client/agent 308, and collaboration engine 310.

In some embodiments, interface(s) 302 include communications interfaces. The interfaces can include network communications interfaces for facilitating communications (e.g., over a network such as the Internet) between the client system and a central host component such as central hosted component 202 of FIG. 2. The interface(s) can be configured to be used to transmit information between various engines/components of the client system and a data syndication and collaboration system such as data syndication and collaboration system 212 of FIG. 2.

In some embodiments, installed application component 304 is configured to provide insurance related applications installed locally at the client. In various embodiments, the insurance related applications include software applications for policy underwriting, claim management, billing, etc. In some embodiments, each insurance carrier (or customer of the installed application component provider) runs their own instance of the claim system on their own premises (or, as another example, the instance is hosted by another entity but controlled by the carrier).

In some embodiments, database 306 is configured to store client-side insurance data. Example data stored in the database includes insurance related data, such as data associated with insurance entities (e.g., insurance claims, policies, accounts, etc.). In some embodiments, the insurance related data includes both standard data and custom data. The standard data can include standard insurance data (e.g., payment amount, coverage code, etc.) that is common across all carriers or otherwise known to the central hosted component. Custom data can include non-standard data fields/elements (e.g., columns in a database) that are created by a carrier and are particular to the carrier. Custom data can also be created for a particular group of carriers. For example, a sub-group of carriers that are in the same industry or are of the same nationality, may have specialized custom fields they would like to track for their group. In some embodiments, the insurance related data is stored in a table database structure, with each column representing a type of data field. Other configurations are possible. Additionally, the database configuration of the client database can be modified, and companies can define their own respective tables and fields, resulting in different database configurations for different clients/carriers.

In some embodiments, data extraction client/agent 308 is configured to communicate data extracted from the client database 306. In some embodiments, the data extraction client is configured to coordinate data extraction/retrieval from the client to a centrally hosted component such as data syndication and collaboration platform 212 of FIG. 2. In some embodiments, interface(s) 302 are utilized by the data extraction client/agent 308 to communicate data between the client system and a data syndication and collaboration platform.

In some embodiments, the data extraction agent is configured to format extracted data into a form appropriate to be processed by the data syndication platform. In some embodiments, formatting the data includes transforming the data into a standard form for processing by the data syndication platform. For example, mapping may need to be performed, as the same type of file may be named differently by different carriers (e.g., personal auto coverage is named "car coverage" on carrier A, but named "automobile coverage" on carrier B). The differently named fields can be mapped to the same personal auto coverage field on the centrally hosted component/platform.

In some embodiments, the data extraction client extracts and transmits data based on received instructions. For example, the data extraction client may be prompted by a central host component to extract and transmit data on-demand. In other embodiments, the data extraction agent is configured to provide information to a central host component automatically, for example, on a periodic basis.

In some embodiments, collaboration engine 310 is configured to facilitate/provide mechanism(s) for client-side case management and collaboration. In some embodiments, the collaboration engine utilizes interface(s) 302 to communicate with a data syndication and collaboration platform such as data syndication and collaboration platform 212 of FIG. 2 to facilitate collaboration and data sharing.

For example, in some embodiments, the collaboration engine is configured to receive a notification/indication from the centrally hosted platform that a pattern has been identified by the platform. Information associated with the pattern (e.g., data fields that make up the pattern) may also be received. In some embodiments, information associated with a potential case collaboration may also be received from the external platform.

In some embodiments, the collaboration engine provides a graphical user interface (e.g., web-based UI tool) to a user of the client system of information received from the external platform. For example, an investigator of the carrier operating the client system can be presented with a user interface that includes a display representation (e.g., message) indicating that a fraud pattern has been identified in the carrier's data, as well as information associated with the pattern (e.g., any implicated accounts associated with the fraud, the type of fraud detected, etc.). In some embodiments, results of an analysis performed by an external component in identifying patterns of interest are provided to the client system and displayed to a user.

In some embodiments, if a fraud pattern has been detected across multiple carriers, options to collaborate with other affected carriers can be presented as well. For example, the investigator can select whether or not they would like to collaborate with other carriers. If so, the investigator can be provided with further options for deciding what information to share with other collaborators. An example of a client-side user interface for collaboration will be described in further detail below in conjunction with FIG. 6.

In some embodiments, the collaboration configuration specified by a user of the client system is then transmitted (e.g., via interface(s) 302) to a centrally hosted/external data syndication and collaboration platform, which, as will be described in further detail below, in some embodiments, is configured to coordinate case management and collaboration among one or more parties involved with a detected pattern.

In some embodiments, client system 300 is implemented using commercially available server-class hardware (e.g., having a multi-core processor(s), 16G+ of RAM, gigabit network interface adaptor(s), and hard drive(s)) running a typical server-class operating system (e.g., Linux). Whenever system 300 is described as performing a task, either a single component or a subset of components or all components of system 300 may cooperate to perform the task. Similarly, whenever a component of system 300 is described as performing a task, a subcomponent may perform the task and/or the component may perform the task in conjunction with other components.

The engines described above can be implemented as software components executing on one or more general purpose processors, as hardware such as programmable logic devices and/or Application Specific Integrated Circuits designed to perform certain functions or a combination thereof. In some embodiments, the engines can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The engines may be implemented on a single device or distributed across multiple devices. The functions of the engines may be merged into one another or further split into multiple sub-units.

Data Syndication and Collaboration Platform

Figure 4:
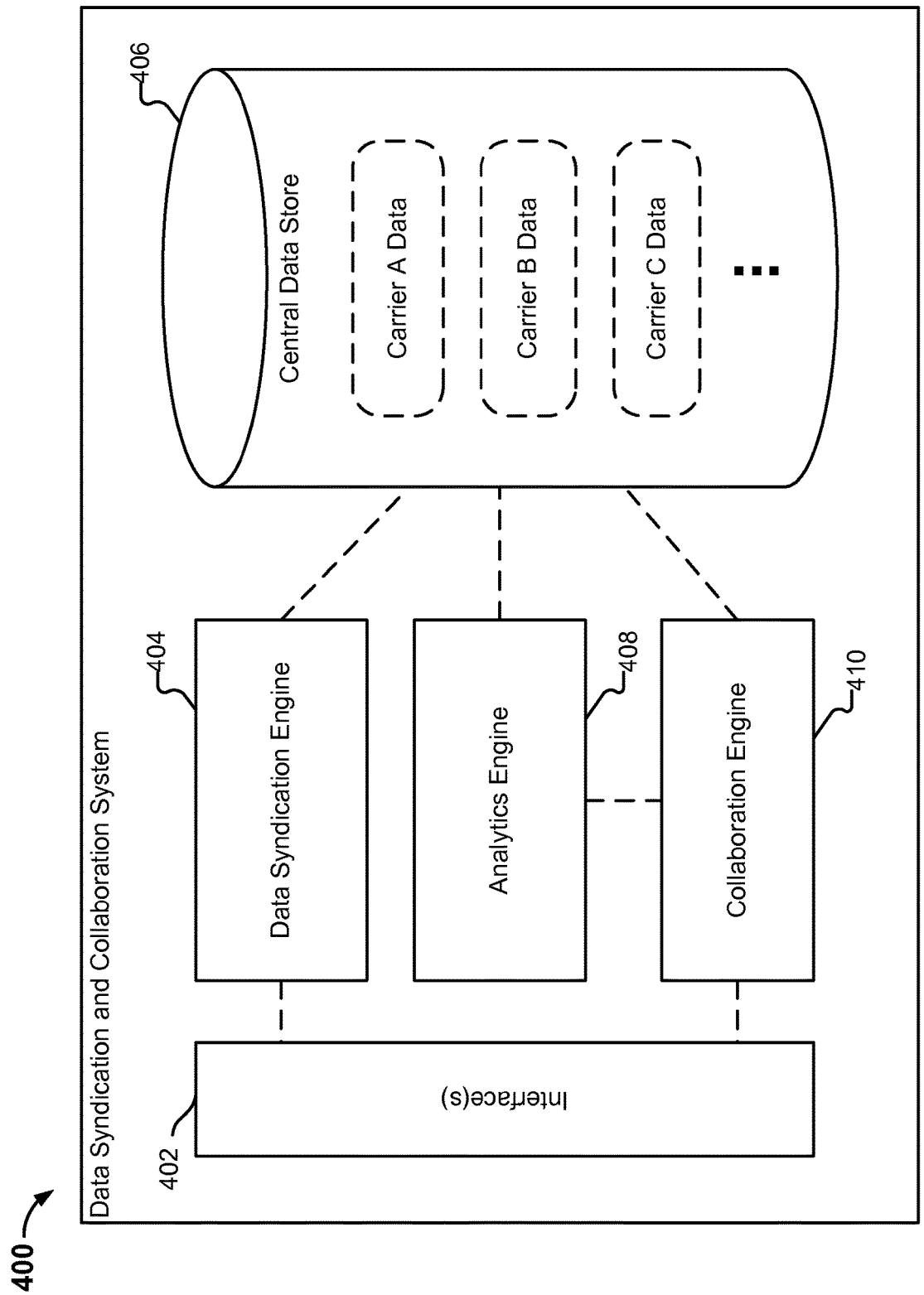
FIG. 4 is a block diagram illustrating an embodiment of a data syndication and collaboration platform.

FIG. 4 is a block diagram illustrating an embodiment of a data syndication and collaboration platform. In some embodiments, data syndication and collaboration platform 400 is an example of data syndication and collaboration platform 212 of central hosted component 202 of FIG. 2. In some embodiments, the data syndication and collaboration platform is configured to provide cross-company/carrier data analytics, data sharing, and case management, along with data security and protection such that companies can configure what data to expose and shield from collaborating parties.

In the example shown, data syndication and collaboration platform 400 includes interface(s) 402, data syndication engine 404, central data store 406, analytics engine 408, and collaboration engine 410.

In some embodiments, interface(s) 402 include network interfaces for communicating data to and from platform 400 (e.g., over the Internet). In some embodiments, interface(s) 402 are configured to communicate data between the platform and on-premise client systems such as client system 300 of FIG. 3.

In some embodiments, data syndication engine 404 is configured to perform cross-carrier data syndication. In some embodiments, data syndication includes aggregating information from multiple different entities (e.g., insurance carriers). When aggregating data, in some embodiments, the data syndication engine is configured to provide instructions to client systems such as client system 300 of FIG. 3 to obtain/collect information. In some embodiments, the instructions include data extraction instructions, which specify the fields to be retrieved (and in some cases, how the fields are to be retrieved) by the client to be sent to the data syndication and collaboration platform. In some embodiments, the data syndication engine communicates with a data extraction agent on the client system (e.g., data extraction agent 308 of FIG. 3) via interface(s) 402 to coordinate data collection/aggregation. In some embodiments, communication between the data syndication and collaboration platform and a client system is initiated periodically (e.g., based on a timer) as part of a batch process (e.g., where the client system is automatically configured to retrieve and transmit information to the data syndication and collaboration platform on a time-driven basis), or on-demand (e.g., asynchronously).

Different types of data syndication can be performed. For example, in some embodiments, the data syndication engine is configured to request data to collect that is extractable/collectable from the core system instances located/installed at the various carriers. In some embodiments, the data that is requested from the carriers can be changed over time (e.g., to expand the data that is collected by the central host component). In some embodiments, the data syndication engine can be configured (e.g., by a user) to extract specific types of information. The data syndication engine is then configured to communicate instructions to a client-side data extraction agent that configure the client-side data extraction agent to collect and transmit the specified types of information.

In some embodiment, the data syndication engine includes listeners configured to collect information transmitted to the platform by a data extraction agent. In some embodiments, a listener is implemented as a process that monitors a specific communication port to receive information transmitted by the data extraction agent. In various implementations, a number of different data formats and protocols can be used to transmit data. The collected data can then be stored in a data store such as central data store 406.

In some embodiments, central data store 406 is a single operational data store/master central repository into which the data received from the various carriers that run different instances of the claim management application is unified. In some embodiments, the collected information is stored in the central data store into a unified, common database schema that incorporates the data from the multiple carriers into a multi-carrier data model, resulting in a set of unified data. In some embodiments, the data is collected and stored according to a common data model. In some embodiments, the data unification is performed on the platform-side, but can also be performed on the client-side. In some embodiments, the data unification includes formatting received data into a common format (e.g., same data structure). The data aggregated from the multiple carriers can also be stored according to a multi-customer/carrier data model using a common schema.

The collected data can be stored in a per-client manner (e.g., partitioned/segregated on a per-carrier basis). For example, each carrier may be associated with a table that includes, for the particular carrier, all fields and values that have been extracted from the particular carrier. Other logical boundaries for maintaining a separation between respective carrier data can be used. In some embodiments, the data for different carriers is stored in different logical areas of the central data store. Additional information (e.g., metadata) for the client's table may be stored. In some embodiments, the data that is stored on a per-carrier basis is stored in such a manner that carriers are restricted from viewing the data of other carriers (i.e., one carrier's data is not visible to another carrier). In some embodiments, the data stored in central data store 406 is secured. For example, the data can be encrypted. Keys for the different data sets can also be stored.

In some embodiments, the data extracted from various carriers is aggregated into a single common repository. For example, the data extracted from the carriers can be anonymized and stored in a community pool of data. In some embodiments, anonymizing the data includes removing carrier-identifiable information from the data aggregated from insurance carriers. For example, a VIN that has been associated with fraudulent claims at a carrier may trigger a warning on systems at other carriers that have claims that contain vehicles with that same VIN. The warnings can be anonymized such that the identity of the source carrier or the details of the fraudulent claim are not discloses. This serves to alert the other carriers that claims that are associated with that VIN should be subjected to increased scrutiny or investigation. In some embodiments, carriers specify or otherwise indicate which data they permit to be aggregated, anonymized, and stored on the central hosted component.

As one example of storing carrier data, in some embodiments, each carrier is associated with a respective table of data that includes various fields for the data collected from the carriers. As another example, in some embodiments, the data from multiple carriers is stored into a single logical space, where the data is tagged such that it can be filtered and accessed according to the various metadata tags. For example, the data can be tagged by carrier, type of data, etc. In some embodiments, the data from the different carriers is separately stored.

In some embodiments, analytics engine 408 is configured to identify patterns across data aggregated from multiple carriers. The patterns can be identified by performing a unified set of analytics processing over the unified data set including the data from multiple customers (e.g., the data stored in data store 406). For example, the analytics can be implemented based on machine learning techniques such as decision trees, support vector machines, or any other appropriate pattern detection/recognition techniques.

For example, a fraud detection routine can learn, based on data collected over time, whether data is indicative of fraud. This information can be used as feedback to adapt parameters of an underlying model for detecting whether pieces of data have certain characteristics/markers that are indicative of fraud. Thus, the model for detecting fraud can be refined over time by the analytics engine. For example, a model can be developed that recognizes that multiple auto claims having similar data characteristics, such as similar claim filing dates, accident location information, vehicle information, and/or contact information, may be a pattern of fraud, where the same auto claim is being filed with multiple insurance carriers. The analytics processing can also be performed according to analytical models built upon the common, unified schema used to store/incorporate data from multiple companies/carriers/customers. As the analytics are performed over a data set that includes data across multiple customers/companies/carriers, signals and patterns that may otherwise have not been detected in a single carrier's data set can be identified.

In some embodiments, each carrier/entity can specify what information of theirs is permitted to be evaluated by the analytics. In some embodiments, the analytics engine is implemented using expandable servers and databases that are configured to process large amounts of data in order to identify patterns/fraud markers that are applied across large data sets.

One example of an identified pattern is as follows: when evaluating syndicated carrier data, the analytics engine can determine that a claimant with a particular cell phone number has different social security numbers in the data for different carriers. In this example, the analytics engine can also determine that the person associated with the same cell phone number has been filing similar types of claims in the same zip code, and that some of the claims may be duplicates. For these reasons, the analytics engine determines that a potential pattern of fraud has been detected. The facts of the pattern (e.g., single cell phone number, different social security numbers with different carriers, duplicate claims in the same zip code seen in multiple carriers, etc.) can then be presented to investigators of the affected carriers (e.g., the carriers in whose data the pattern or similar patterns have been identified) for validation.

In some embodiments, patterns are assigned scores. The scores can be used to indicate a confidence of the pattern (e.g., confidence level that the pattern is a sign of fraud). In some embodiments, the scores are a numerical representation of the relative value of investigating a claim. For example, a social security number that has been associated with a fraudulent claimant on a previous claim is much more likely to be a signal of fraud on a new claim. Thus, that claim would be given a higher score than a similar claim with that social security number. Scoring can be the result of a machine learning process, or based on algorithms created by users (e.g., experts in fraud investigation). In some embodiments, sub-scores generated based on specific patterns can be combined to create an overall fraud score for a claim. In some embodiments, various actions can be triggered based on whether a score for a pattern exceeds a threshold. For example, collaboration processes can be automatically initiated if the score for a pattern exceeds a threshold.

The processing performed by the analytics engine can be configured to be performed across the data collected from the various instances of the claim management application executing on the respective carriers. For example, the analytics engine can perform pattern recognition while treating the collected data as a single uniform set of data. The analytics processing can also be performed on one carrier's data set at a time. For example, if a pattern is first detected in the data of a single carrier, the analytics engine can then determine/detect whether the pattern extends to or is replicated in the data of other carriers. In other embodiments, a signal detected in one carrier's data set can be evaluated using the data sets of multiple carriers, which may affect the strength (e.g., score) of the signal.

In some embodiments, identified signals and patterns are validated. As one example, suppose that a fraud pattern is detected in the set of data associated with Carrier A. After investigators for Carrier A confirm/validate that three instances of fraud have been identified, the analytics engine can apply the results of the fraud detection to the other customers who have data stored with the central host component to further boost any detected fraud signals/patterns. For example, when attempting to detect fraud in a Customer B's instance of data, fraud pattern signals may be present but not be strong enough to indicate that fraud has indeed occurred. However, confirmation of a similar fraud signal in Carrier A can be used to reinforce the fraud signals detected in Carrier B, thereby increasing their strength, indicating an increase in likelihood that fraud has also occurred in Carrier B. Such mutual strengthening is available due to the ability to perform analytics on multi-carrier data sets.

As described above, validation of the pattern can be used to strengthen the likelihood that a pattern has been found. For example, if a pattern is validated (e.g., by an investigator), the validation can be used as feedback to increase the score for the pattern. As another example, the status of the pattern can be changed from being a potential pattern to a validated/verified pattern. Various actions can then be taken in response to the validation. For example, suppose that the analytics engine first identifies a pattern in the data of a single carrier. Once the pattern is validated by an investigator of the single carrier, the analytics engine then attempts to determine if the validated pattern (or patterns similar to the validated pattern) is also found in the data of other carriers. In some embodiments, the analytics engine is configured to directly search over the data of multiple carriers to determine/detect suspicious fraud patterns.

In some embodiments, validation is performed automatically. For example, identified signals can be scored based on their amplitude. If the amplitude exceeds a threshold, the pattern is automatically validated. For example, a potential fraud signal can be scored according to a variety of criteria (e.g., based on a determination of a match to a rule/model), and if the score/amplitude of the signal exceeds a threshold, then the signal is validated.

In some embodiments, validation of a signal is used to refine pattern recognition. For example, in response to the validation/invalidation of a pattern (e.g., by a user such as an investigator, or automatically), the analytics engine is configured to learn that the signal is a meaningful pattern. For example, if an investigator indicates that a potential fraud signal is indeed valid, then the analytics engine can adapt (e.g., via machine learning model adaptation) to recognize that the identified signal/pattern is a valid pattern for indicating fraud. The pattern can then be applied to other data sets to determine whether fraud is present.

In the above examples, pattern detection for fraud was described. As another example, analytics can be performed over aggregated data to more precisely define the boundaries of a natural disaster. For example, claims relevant to a particular storm can be identified from the data collected from multiple carriers, and the location information associated with those claims used to define the boundaries of a hurricane, which would be more accurate than if defined using only the data from a single carrier.

As described above, in some embodiments, the validation of a pattern includes requesting feedback from a user such as an investigator. For example, based upon an evaluation of carrier data, the analytics engine can present an identified pattern to an investigator, who can validate or provide an opinion on the pattern. If the pattern is validated, in some embodiments, the analytics engine uses the validated pattern to determine whether a similar type of pattern is found in the data of other carriers. In some embodiments, if the pattern is identified in other carriers, then a collaboration process can be initiated.

As one example, suppose that an investigator validates a pattern that identifies an issue with a particular claimant. The analytics engine can notify an investigator that similar types of patterns to the pattern that they validated have been identified in the data of three other carriers, and ask the investigator whether or not they would like to share this information with them and collaborate on an investigation. In response to the prompt, the investigator can respond by indicating that they are willing to share information (that may be proprietary to the investigator's organization) with the other identified companies. By collaborating with other companies to investigate potential fraud, fraudsters can be prosecuted and money attempted to be retrieved, or claims can be denied before payment is made. Collaboration will be described in further detail below.

In some embodiments, collaboration engine 410 is configured to facilitate/coordinate the collaboration of multiple parties in addressing an identified signal. In some embodiments, the collaboration engine is configured to coordinate case management among the various parties. For example, if a fraud signal is detected by the analytics engine, the results of the fraud detection can be presented to the investigators of the affected carriers, who can observe and manipulate the results, as well as collaborate on subsequent steps in addressing the identified fraud.

In some embodiments, the collaboration process is triggered based on the identification (e.g., by the analytics engine) of a salient pattern. As described above, in order to identify the pattern and find affected carriers, an analytics engine such as the one described above analyzes the syndicated data collected across multiple carriers. Patterns that transcend carrier boundaries can then be identified.

Based on the detection of a fraud pattern (or similar patterns) in multiple companies by the analytics engine, the collaboration engine can initiate the collaboration process, for example, by requesting the affected parties to collaborate with each other. By sharing proprietary company information with each other (where the companies involved may be potential competitors), the parties may be able to cooperate in a manner that benefits the group as a whole (e.g., to identify and root out fraudulent activities).

For example, users such as investigators who are representatives of affected companies can agree to share information associated with the pattern identified across other affected companies. Once one investigator agrees to share information with other investigators from other respective companies, those other investigators are also notified that there is an investigator who would like to share information with them, and asked whether or not they would like to collaborate. For the parties that agree to consent to collaboration, their respective data (that they are willing to share) can be included in a pool of investigatory data for the particular case under consideration, in which multiple investigators across multiple carriers are working.

In some embodiments, facilitating initiation of case collaboration includes notifying users associated with the affected carriers. In some embodiments, the collaboration engine is configured to use interface(s) 402 to send notifications to users of identified patterns. In some embodiments, notifications are generated and used to obtain carrier consent to collaborate on data relevant to an identified pattern.

In some embodiments, notifying users of carriers of identified patterns includes making requests to share data across carriers. The notifications can be configured to include different information based on the intended recipients of the notifications. For example, if a pattern has been identified in the data for Carrier A, and an investigator for Carrier A is being notified, then proprietary information about the pattern can be presented to the investigator (i.e., because the pattern and the investigator are associated with the same carrier). However, if the notification indicates that a similar pattern has been found in Carrier B, and the investigator for Carrier A is asked whether they would like to collaborate with Carrier B, the proprietary information for Carrier B is not shown to the investigator for Carrier A.

As one example of information that is included in a notification, suppose that a pattern has been detected in the data for Carrier A indicating that a claimant in Carrier A is potentially the same claimant in Carrier B. An investigator for Carrier A is notified by the collaboration engine about the detected pattern indicating the potentially fraudulent claimant, and provided information about the claim incident in Carrier A that is under suspicion. The investigator for Carrier A is notified that the pattern has also been found in Carrier B, but with proprietary information for Carrier B withheld from the investigator. In some embodiments, the identities of the other potential collaborators is withheld, and, for example, Carrier A is only notified that other carriers are also implicated in the identified pattern.

In some embodiments, the collaboration engine is configured to provide information to be displayed to a user. For example, user interfaces can be provided to end-users to specify the information that is allowed to be displayed to each of the users associated with the collaborating parties.

For example, users on the carrier-side can access the collaboration information via displays. The information that is allowed to be displayed for a particular screen is specified according to the sharing configurations, and extracted accordingly from the central repository. For example, the collaboration engine, when facilitating sharing and display of data, is configured to filter the data from the central store based on the carrier to which information is to be shown. In some embodiments, additional layers of security, such as encryption, are performed on the data that is to be rendered to the users on the carrier/client-side. In some embodiments, the data that is displayed is anonymized, where which source (carrier) shared what particular set of data is withheld and not displayed (e.g., the carrier to which a particular piece of data originated/was obtained from is not provided).

In some embodiments, the collaboration engine is configured to facilitate the sharing of information among collaborating parties. For example, in some embodiments, the collaboration engine is configured to cause only portions of data that belong to the carriers who have consented to be presented, while data portions that belong to non-consenting carriers are shielded and prevented from being presented. Additionally, for those parties that consent to share information, each party is provided configuration options for selecting which pieces of data they allow to share and/or which data should be shielded. Based on the configuration, the data that is obtained from carrier data stores (e.g., central data store 406) can be filtered accordingly before being presented to other collaborating parties.

For example, an investigator for Carrier A can be presented with all of the information in Carrier A's data set that is relevant to an identified pattern. The investigator can then select what they would like to share. The investigator can also select what they would like to exclude from sharing. Thus, users are provided with control over what data is shared. In the example environment of FIG. 2, Carrier A can, for example, indicate that they are willing to share a claimant's name and address, and car model. However, Carrier B is willing to share the name and car model, while Carrier C consents to share the name and the address.

In some embodiments, the collaboration engine supports the configuration of data sharing profiles. For example, carriers can specify profiles that specify configuration parameters/rules for collaboration. As one example, carriers/parties can create a list of favorite collaborators for streamlining collaboration partners. For example, favorite contacts (e.g., specified via emails) at carriers can be specified. As another example, the configuration profiles can be used to indicate that more specific data can be automatically pre-approved to be shared with certain companies and that consent can be automatically given. For example, Carrier A can indicate that consent is automatically provided for collaborating with Carrier B, but not for Carrier C. Thus, rules can be defined that specify what information is permissible to share, which can be configured to also vary depending on which other carriers are collaborating on a case. Default rules for which entities to collaborate with and what information to share/shield can also be configured to further streamline collaboration. Thus, the collaboration rules that are specified can be used to define a protocol that can be used to manage the potentially sensitive information that is shared among the companies (e.g., to share minimum necessary in order to perform collaboration and investigation).

In some embodiments, the collaboration engine is configured to provide a handshake protocol for facilitating collaboration. The handshake protocol is used to determine the terms of the collaboration among consenting parties. For example, suppose that investigators for Carriers A, B, and C are asked to collaborate on a case involving a potentially fraudulent claimant. If only Carriers A and B agree to collaborate, but Carrier C does not, then the data specific to Carrier C will not be shared as part of the case. However, the data from Carriers A and B will be part of the case.

In some embodiments, controls for controlling the information to be shared with other collaborators are provided to the collaborators via configuration user interfaces. For example, when notifying a user of an identified pattern to the user, options are provided to the user for specifying what particular fields of data (in their carrier's data set) that they allow to be shared or displayed to other collaborators. For example, the collaboration engine can present to an investigator of a particular carrier the data in the particular carrier's data set that is relevant to an identified pattern. The types of data fields are common across the syndicated data for the carriers because they have been stored in the same format. The investigator is then provided with options for selecting which of the fields they would like to share. An example interface for configuring data to be shared is shown below in conjunction with FIG. 7.

In some embodiments, a "quid pro quo" sharing mechanism is implemented in which the more data that one side shares, the more that the other parties are encouraged/incentivized to share additional data, where users are provided control over the sharing process. For example, a first carrier can configure data sharing such that if a second carrier elects to provide an additional type of data field from the second carrier's data store, the first carrier automatically shares the same type of data field from the first carrier's data store.

In some embodiments, the determination of the data that is shared by each party is automated. For example, if the signal strength/amplitude/score of a pattern exceeds a threshold, then collaboration is automatically initiated and it is predetermined what data is to be shared. Policies can also be implemented that define, for different scenarios (e.g., the severity of a pattern as indicated by its score), the configuration of the collaboration/case management to be performed (e.g., notification of parties, data to be shared, etc.).

In some embodiments, the collaboration engine is configured to provide case management. For example, when a new pattern is detected that is to be investigated, the collaboration engine can create a case object data structure that is representative of the multi-company case to be managed. In some embodiments, the collaboration engine is configured to combine existing cases into a single cross-company case (in other words, combining data from multiple existing case objects into a single cross-company case object), where multiple users such as investigators from different companies/carriers working together may use this object (i.e., the collaboration engine expands a case to include more people with respect to who is an employee of what carrier).

In some embodiments, a created case object is associated with a pool of investigatory data, wherein the investigatory data includes the data consented to be shared by collaborating parties. The data can include data that is obtained from a central repository such as central data store 406 and filtered according to the sharing configuration. In some embodiments, the filtering includes permitting fields that were consented to be shared to be added to the investigatory data pool, and shielding data that was not consented to be shared by the collaborating carriers (e.g., preventing the non-consented data from being added to the investigatory data pool). In some embodiments, certain types of information, such as proprietary carrier data, or other types of metadata can be automatically filtered and prevented from being stored in the investigatory data pool.

In some embodiments, the data that is obtained from the central repository is copied to a data structure that is used to store investigatory data. In other embodiments, references to data that is consented to be shared are stored.

In some embodiments, the information stored in the investigatory data pool is separated by logical carrier boundaries, as with the central repository. In some embodiments, all data consented to be shared is stored in a common pool of data, where, for example, the data is anonymized such that no indication of the origin (i.e., carrier) of the data stored in the pool is stored (e.g., any information identifying the source of a piece of data is removed).

An example of data structures for data sharing is provided below in conjunction with FIG. 9.

In some embodiments, the case object is associated with a sharing configuration file, which specifies a mapping of investigatory data. In some embodiments, the mapping specifies which information carriers have permitted other carriers to view, as well as what information has been shielded by carriers from other carriers. For example, the mapping can indicate that a first carrier has permitted a first set of data in the investigatory pool to be presented to a second carrier, while the first carrier has permitted a second set of data in the investigatory pool that is different from the first set of data to be presented to a third carrier. In some embodiments the sharing configuration file is configured as described above, for example, via configuration of user interfaces, based on automatic rules (e.g., according to signal strength scores/thresholds, predetermined collaboration agreements between parties, etc.), etc.

In some embodiments, the collaboration engine is configured to provide/present data to the various collaborating parties based on the configuration of sharing. For example, based on the respective carriers' investigator selections, data can be obtained from the respective carrier data sets (e.g., from central data store 406) that is appropriately filtered (according to what has been specified as being permitted/ shielded) and presented to the collaborating parties. As one example, the sharing configuration file associated with a case object, as described above, can be used to retrieve data (either from an investigatory pool associated with the case object or from a central repository). The data that is presented to the various collaborating parties is filtered and presented appropriately according to the sharing configuration file.

In some embodiments, the collaboration engine is configured to support user interfaces (e.g., via a web-based UI tool/wizard) for a case collaborator application that is accessible by users. For example, upon receiving a notification, a user can access (e.g., via a link embedded in the notification) a case collaborate application hosted by the collaboration engine/platform of the central hosted component. In some embodiments, the case collaborator application is a web-based tool/wizard that provides various user interfaces for collaborating on a case. In some embodiments, client systems have installed native applications for collaboration that present information provided by/obtained from platform 400.

In some embodiments, platform 400 is implemented as a software-as-a-service (SAAS) platform for data syndication and collaboration. In some embodiments, platform 400 is implemented using commercially available server-class hardware (e.g., having a multi-core processor(s), 16G+ of RAM, gigabit network interface adaptor(s), and hard drive (s)) running a typical server-class operating system (e.g., Linux). Whenever platform 400 is described as performing a task, either a single component, or a subset of components, or all components of platform 400 may cooperate to perform the task. Similarly, whenever a component of platform 400 is described as performing a task, a subcomponent may perform the task and/or the component may perform the task in conjunction with other components.

The engines described above can be implemented as software components executing on one or more general purpose processors, as hardware such as programmable logic devices and/or Application Specific Integrated Circuits designed to perform certain functions or a combination thereof. In some embodiments, the engines can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The engines may be implemented on a single device or distributed across multiple devices. The functions of the engines may be merged into one another or further split into multiple sub-units.

Figure 5:
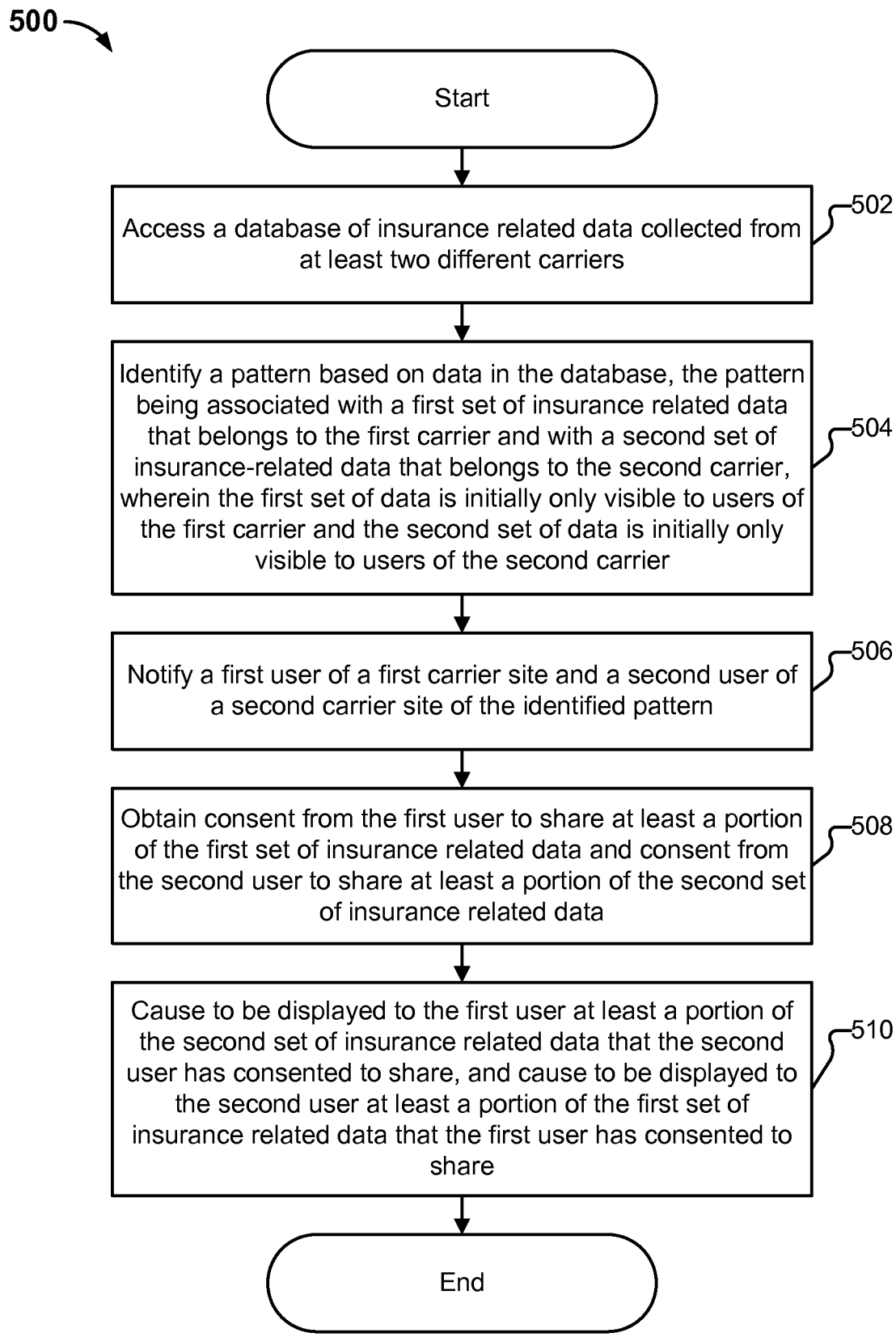
FIG. 5 is a flow diagram illustrating an embodiment of a process for signals-based data syndication and collaboration.

FIG. 5 is a flow diagram illustrating an embodiment of a process for signals-based data syndication and collaboration. In some embodiments, process 500 is executed by data syndication and collaboration system 400 of FIG. 4. The process begins at 502 when a database of insurance related data collected from a plurality of carriers is accessed. For example, in some embodiments, a database of data aggregated from a plurality of carriers is accessed. As described above, in some embodiments, the respective data collected from the plurality of carriers is compartmentalized/logically separated. In some embodiments, the data collected from the carriers is anonymized and aggregated together.

At 504, a pattern is identified based on data in the database. As one example, suppose that a pattern is identified that is associated with a first set of insurance related data that belongs to a first carrier and with a second set of insurance related data that belongs to a second carrier. In some embodiments, the first set of data is initially only visible to the users of the first carrier, and the second set of data is initially only visible to users of the second carrier. In some embodiments the pattern is a pattern of suspicious activities or claims that have been identified via an analysis of the data in the database. As described above, in some embodiments, patterns are detected according to rules/models that are indicative of the presence of certain sets of characteristics (e.g., markers of potential fraud). In some embodiments, machine-learning techniques can be used to refine the model for detecting different types of signals/ patterns. In some embodiments, patterns are assigned scores, which can be used to indicate a confidence that a set of data is indicative of a type of pattern (e.g., fraud pattern).

In some embodiments, patterns that are automatically identified in insurance carrier data are validated. For example, investigators of insurance carriers in whose data a pattern is detected can be notified of the potential pattern and requested to validate the pattern as being a confirmed pattern (e.g., validate that the pattern of data is indeed indicative of fraud). In other embodiments, a pattern is automatically validated if the score for the pattern exceeds a threshold.

At 506, users associated with respective carriers in which whose data the pattern has been identified are notified. For example, a first user of the first carrier site and a second user of a second carrier site are notified of the pattern. Users (e.g., investigators) can be sent notifications (e.g., email messages, alerts, etc.) through case management tools (e.g., web-based or native applications) that indicate that a pattern in their respective carriers' data has been identified.

At 508, respective consent to share portions of the respective carrier data sets is obtained. For example, consent from the first user to share at least a portion of the first set of insurance related data and consent from the second user to share at least a portion of the second set of insurance related data are obtained.

In some embodiments, the consent is obtained in response to requests made to the users to share data pertaining to the pattern that was identified across the data sets of multiple carriers.

In some embodiments, obtaining consent includes receiving from the users specifications of consent and/or non-consent to share at least some of the data pertaining to the pattern that belongs to the respective carriers. For example, a first set of data associated with the pattern can be shown to the first user, and the user can select which data to share.

In some embodiments, rules can be configured for obtaining consent. For example, if a score for the severity of the pattern exceeds a threshold, then consent can be automatically obtained.

In some embodiments, the requests and obtained consent are programmed according to rules. For example, a user of one carrier can configure a list of favorite collaborators, streamlining which partners the carrier collaborates.

As another example, rules can be established with respect to sharing, where certain sets of data are automatically shared by default. Such sharing can be configured on a carrier-by-carrier basis, where, for example, carrier A consents to share, by default, different sets of information with carriers B and C, respectively.

At 510, the portions of the data that the users have requested to share with each other are presented to be displayed. For example, the portion of data that the second user has consented to share is presented to be displayed to the first user, and the portion of data that the first user has consented to share is presented to be displayed to the second user.

In some embodiments, the data that is presented to the first user is data that was determined to be sharable by the second user. In some embodiments, data that is determined to be non-sharable by the second user (e.g., according to the second user's specification) is shielded such that the first user is unable/prohibited from viewing the non-sharable data. One example of data that is shared is the identities of representatives within each carrier that can be contacted for direct collaboration (e.g., points of contact). For example, suppose that Carrier A has a representative named John Jones who is the lead investigator for the claim in question. Other carriers can contact him directly, as well as identifying their respective points of contact. Other examples of sharable data will be provided below.

Interface Examples

Figure 8:
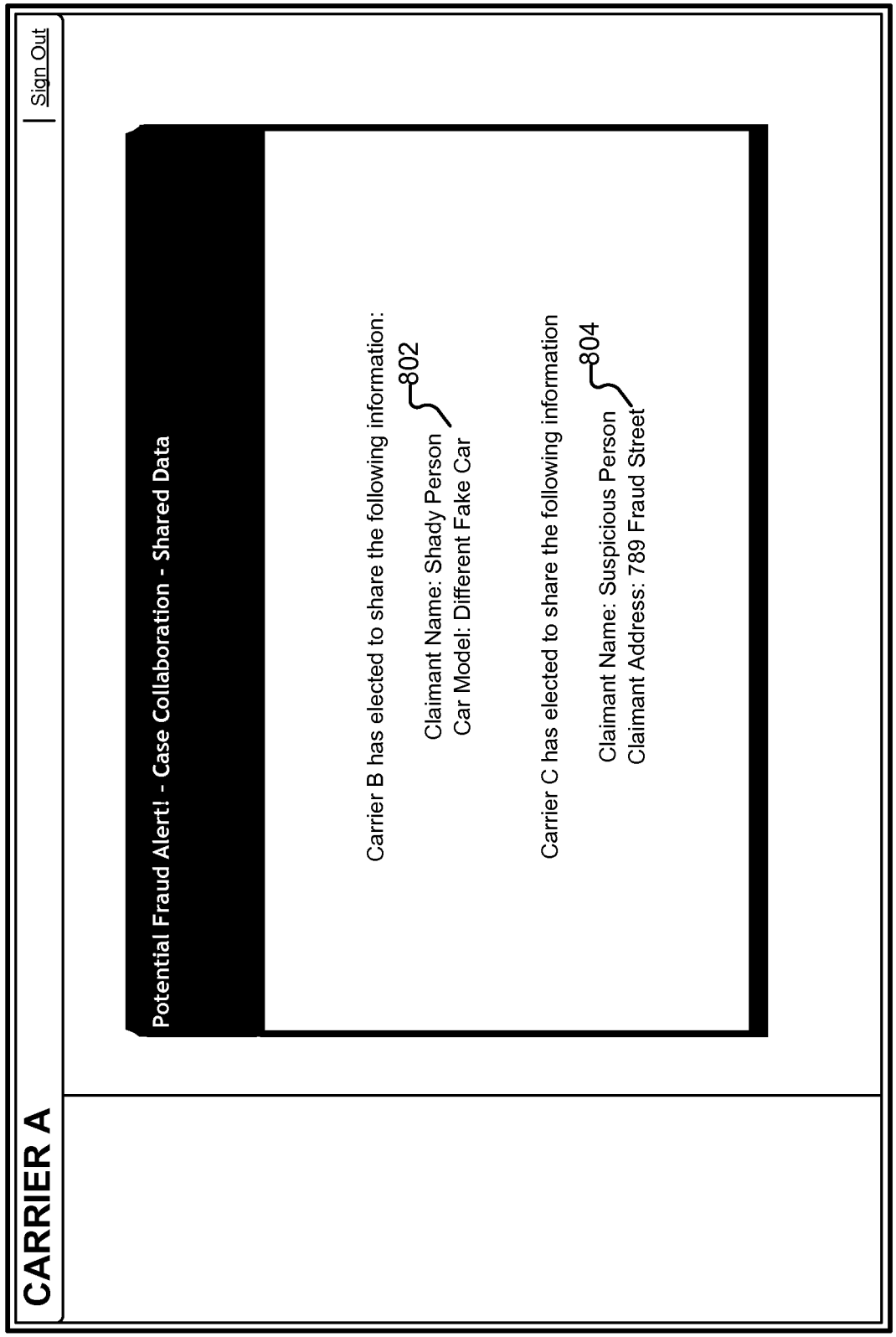
FIG. 8 is a diagram illustrating an embodiment of an interface for viewing shared data.

FIGS. 6-8 illustrate example interfaces for case collaboration. In some embodiments, the example interfaces of FIGS. 6-8 are provided to users as part of a collaboration tool that is supported by the data syndication and collaboration facilitation of a system such as data syndication and collaboration system 212 of FIG. 2 and data syndication and collaboration system 400 of FIG. 4. In some embodiments, the example interfaces of FIGS. 6-8 are presented to users of client systems such as client systems 204-208 of FIG. 2 and client system 300 of FIG. 3. For example, the example interfaces are generated by the client system using information obtained from the data syndication and collaboration system.

In the following example interfaces of FIGS. 6-8, a user associated with an insurance carrier A is notified of a potentially fraudulent claim that is a part of an identified pattern of fraud that includes fraudulent claims filed with insurance carriers B and C as well. In some embodiments, the pattern is identified by a system such as data syndication and collaboration system 400 of FIG. 4, which runs pattern analysis/signal detection across data aggregated from multiple carriers to identify any patterns within the data. Using the interfaces below, the user associated with insurance carrier A can collaborate with users of carriers B and C, for example, to share information about similarly filed claims that may be indicative of fraud, and to further investigate those claims.

FIG. 6 is a diagram illustrating an embodiment of an interface for notifying a user. In this example, a user associated with carrier A is sent an alert that a potentially fraudulent claim has been identified in the data of carrier A. At 602, information associated with the claim (e.g., claim number, claimant name, claimant address, model of car in filed claim, etc.) is shown. In this example, a person by the name "Shady Person" living at "789 Fraud Street" has filed a claim with carrier A for a "Fake Car" model. At 604, the user is notified that claims similar to the one identified in the data of carrier A have also been identified at carriers B and C. In some embodiments, the identities of the other potential collaborating parties is not presented, and, for example, the user associated with carrier A is only notified that there are one or more other affected parties. In this example, the user is then asked whether they would like to collaborate with users of those carriers to further investigate the identified pattern of fraud. At 606, the user has indicated they would like to collaborate with carriers B and C. In this example, an option to collaborate with both other affected parties is shown. In some embodiments, the user is presented with an option to individually select which parties they would like to collaborate with (or exclude from collaborating with).

FIG. 7 is a diagram illustrating an embodiment of an interface for sharing data. In this example, the user, who is an employee of carrier A, is prompted to specify what data they would like to share with users of the carriers B and C. In the example shown, the user is provided the option to share different sets of fields with the respective carriers (e.g., the user can indicate what information to share on a carrier-by-carrier basis). As shown, the user associated with carrier A has elected to share, at 702 and 704, all of the fields with users of carriers B and C. The user could also select to share different sets of fields with the respective carriers. In some embodiments, the user is prompted to share the same set of information to all collaborating parties.

FIG. 8 is a diagram illustrating an embodiment of an interface for viewing shared data. In this example, the user associated with carrier A is shown the information that the users of the respective carriers B and C have elected to share with the user of carrier A. As shown at 802, a user of carrier B has elected to share (or has not otherwise shielded) information that a person by the same name "Shady Person" has also filed a claim with carrier B, but for a car that is of a different model from the claim filed with carrier A. As shown at 804, a user of carrier C has elected to share that an auto claim filed with carrier C has been filed by a person at the same address as "Shady Person," but under a different name. In this example, the identities of the carriers providing the respective shared information are shown. In other embodiments, the identities of the collaborating parties whose data is shared are not presented to the other parties (e.g., the identities of the collaborating carriers is withheld, and the information that is displayed does not include an indication of the source/origination of the information).

Having been made aware of a pattern of fraudulent claims across the three carriers, the respective users (e.g., investigators) of the carriers can continue to collaborate on further investigating the case of fraud.

FIG. 9 is a diagram illustrating an embodiment of data structures used for collaboration. In some embodiments, the example data structures of FIG. 9 are used to support the data sharing and collaboration example of FIGS. 6-8.

In this example, carrier data stored in a central repository such as central data store 406 of FIG. 4 is shown at 902. As shown, claims 904, 906, and 908 correspond to claims in respective Carriers A, B, and C that have been determined to be indicative of a pattern of fraud. The claim data of 904, 906, and 908 illustrate the full claim data for the carriers extracted from their respected client systems.

As shown in the interface example of FIG. 7, users associated with the carriers can specify/configure what information associated with the identified claims they consent to share (or would like to withhold/shield) with the other carriers. In this example, based on the collaboration configuration, the information consented to be shared by the carriers is added to investigatory data pool 910. As described above, in some embodiments, the investigatory data comprises a pool of data associated with the case which the collaborators have consented to share with each other. In some embodiments, the investigatory pool of data is associated with a case object instantiated for the case that the carriers' users are collaborating on, where the investigatory data pool as well as the case object are created and managed by a collaboration engine such as collaboration engine 410 of FIG. 4, as described above.

In this example, carrier A has agreed to share claimant name, claimant address, and car model data associated with claim 904. Thus, in this example, all three fields are added to the data pool at 912. In some embodiments, the actual data is copied from the central data repository to the investigatory data pool. In other embodiments, pointers/references to the actual data fields consented to be shared are stored. In the example shown, the claim number for the claim, which is proprietary to the carrier is not included in the investigatory data pool. Other information, such as proprietary carrier information, can be scrubbed/removed prior to being added to the investigatory data pool.

In this example, carrier B has consented to share only the claimant name and car model of implicated claim 906 with the group. Thus, only the claimant name and car model are stored to the investigatory data pool at 914, while the claimant address is shielded from being added. Similarly, carrier C has consented to share only the claimant name and claimant address of claim 908, which are stored at 916, while the car model is not stored.

In some embodiments, information obtained from the central repository is filtered according to a sharing configuration (e.g., via user specification via the example interface of FIG. 7), with the resulting filtered data stored to the investigatory data pool.

In some embodiments, for all carriers that consent to collaborate on a case involving an identified pattern, all of the information associated with an indicated pattern is obtained from the central repository and stored in the investigatory data pool for the case. For example, for each collaborating party/carrier, a superset of the information consented to be shared by a given party (where the given party may share different sets of data with different parties, and the superset is the union of the various different sets of shared data) is maintained in the investigatory data pool (e.g., obtained from the central repository and stored in the investigatory data pool, or via references stored in the investigatory data pool).

In some embodiments, a sharing configuration file associated with the case is established that maintains a mapping of what data is consented to be shared between various collaborators and what information is to be shielded. The sharing configuration file is configured according to the carriers' respective user configurations of what respective data they consent to share (or what they wish to shield) with/from each other. For example, the sharing configuration file can maintain a mapping that specifies that carrier A has consented to share claimant name and address, but not car model, with carrier B, while at the same time, carrier A has consented to share claimant address and car model, but not claimant name, with carrier C.

In some embodiments, the data included in the investigatory data pool can be modified throughout the course of case collaboration. For example, the collaborating parties, can, on-demand, add or remove data from the investigatory data pool. The data stored in the investigatory data pool (e.g., copies of data or references to data in a central repository) is then modified accordingly. If a sharing configuration file is implemented, the mapping maintained by the sharing configuration file is updated accordingly as well. The information that is presented to the respective carriers is provided in accordance with the sharing configuration.

Signal-based data syndication and collaboration of insurance information has been disclosed. The technique described allows insurance carriers that are competitors with each other in the market place to share data and collaborate on common issues, such as fraud detection, without compromising the carriers' need to protect certain proprietary data from competitors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
collect insurance related data from a plurality of carriers, wherein the collecting comprises initiating communication with an on-premise installation associated with a carrier based at least in part on a timer as part of a batch process;
access a data store including the insurance related data collected from the plurality of carriers;
based at least in part on an analysis performed across the insurance related data collected from the plurality of carriers, wherein the analysis is performed according to a fraud detection model:
detect a first pattern indicative of fraud in a first set of insurance related data belonging to a first carrier; and
detect a second pattern indicative of fraud in a second set of insurance related data belonging to a second carrier, wherein the second pattern is associated with a score, wherein the score is used to indicate a confidence that the second pattern is indicative of an occurrence of fraud in the second carrier, and wherein the score is below a validation threshold;
in response to detection of the first pattern indicative of fraud in the first set of insurance related data belonging to the first carrier, increase the confidence that the second pattern is indicative of the occurrence of fraud in the second carrier at least in part by increasing the score associated with the second pattern;
automatically validate the detected second pattern in response to determining that the increased score associated with the second pattern exceeds the validation threshold;
based at least in part on the validation of the second pattern, initiate collaboration processing, wherein initiating the collaboration processing comprises notifying first and second users associated with the first and second carriers, respectively, of the detected first and second patterns indicative of fraud, and wherein the notifying comprises presenting, to at least one of the first user and the second user, an option to collaborate;
obtain consent from the first user to share at least a portion of the first set of insurance related data and consent from the second user to share at least a portion of the second set of insurance related data;

cause to be presented to the first user, in a first user interface, at least the portion of the second set of insurance related data that the second user has consented to share, wherein an identity of the second user is withheld in the first user interface from the first user; and cause to be presented to the second user, in a second user interface, at least the portion of the first set of insurance related data that the first user has consented to share, wherein an identity of the first user is withheld in the second user interface from the second user; and a memory coupled to the processor and configured to provide the processor with instructions.

2. The system recited in claim 1 wherein notifying the first and second users includes making requests to the users to share data pertaining to the detected first and second patterns.

3. The system recited in claim 1 wherein the first user is presented data in the first set of insurance related data belonging to the first carrier that is relevant to the detected first pattern.

4. The system recited in claim 3 wherein the processor is further configured to receive a selection of at least some of the presented data.

5. The system recited in claim 4 wherein the selection includes an indication of data that is sharable.

6. The system recited in claim 4 wherein the selection includes an indication of data that is not sharable.

7. The system recited in claim 6 wherein the processor is further configured to shield data portions indicated to be non-sharable from being displayed to the second user.

8. The system recited in claim 1 wherein consent is automatically granted based at least in part on the score exceeding the validation threshold.

9. The system recited in claim 1, wherein the fraud detection model is determined at least in part by performing machine learning.

10. The system recited in claim 1, wherein the notifying comprises transmitting a notification including a link, and wherein a centrally hosted case collaboration application is accessible via the link included in the notification.

11. A method, comprising:

collecting insurance related data from a plurality of carriers, wherein the collecting comprises initiating communication with an on-premise installation associated with a carrier based at least in part on a timer as part of a batch process;

accessing a data store including the insurance related data collected from the plurality of carriers;

based at least in part on an analysis performed across the insurance related data collected from the plurality of carriers, wherein the analysis is performed according to a fraud detection model:

detecting a first pattern indicative of fraud in a first set of insurance related data belonging to a first carrier; and detecting a second pattern indicative of fraud in a second set of insurance related data belonging to a second carrier, wherein the second pattern is associated with a score, wherein the score is used to indicate a confidence that the second pattern is indicative of an occurrence of fraud in the second carrier, and wherein the score is below a validation threshold;

in response to detection of the first pattern indicative of fraud in the first set of insurance related data belonging to the first carrier, increasing the confidence that the second pattern is indicative of the occurrence of fraud in the second carrier at least in part by increasing the score associated with the second pattern;

automatically validating the detected second pattern in response to determining that the increased score associated with the second pattern exceeds the validation threshold;

based at least in part on the validation of the second pattern, initiating collaboration processing, wherein initiating the collaboration processing comprises notifying first and second users associated with the first and second carriers, respectively, of the detected first and second patterns indicative of fraud, and wherein the notifying comprises presenting, to at least one of the first user and the second user, an option to collaborate;

obtaining consent from the first user to share at least a portion of the first set of insurance related data and consent from the second user to share at least a portion of the second set of insurance related data;

causing to be presented to the first user, in a first user interface, at least the portion of the second set of insurance related data that the second user has consented to share, wherein an identity of the second user is withheld in the first user interface from the first user; and causing to be presented to the second user, in a second user interface, at least the portion of the first set of insurance related data that the first user has consented to share, wherein an identity of the first user is withheld in the second user interface from the second user.

12. The method of claim 11 wherein notifying the first and second users includes making requests to the users to share data pertaining to the detected first and second patterns.

13. The method of claim 11 wherein the first user is presented data in the first set of insurance related data belonging to the first carrier that is relevant to the detected first pattern.

14. The method of claim 13, further comprising receiving a selection of at least some of the presented data.

15. The method of claim 14 wherein the selection includes an indication of data that is sharable.

16. The method of claim 14 wherein the selection includes an indication of data that is not sharable.

17. The method of claim 16, further comprising shielding data portions indicated to be non-sharable from being displayed to the second user.

18. The method of claim 11 wherein consent is automatically granted based at least in part on the score exceeding the validation threshold.

19. The method of claim 11 wherein the insurance related data collected from the plurality of carriers is anonymized at least in part by removing carrier-identifiable information.

20. A computer program product embodied in a non-transitory computer readable storage medium and comprising computer instructions for:

collecting insurance related data from a plurality of carriers, wherein the collecting comprises initiating communication with an on-premise installation associated with a carrier based at least in part on a timer as part of a batch process;

accessing a data store including the insurance related data collected from the plurality of carriers;

based at least in part on an analysis performed across the insurance related data collected from the plurality of carriers, wherein the analysis is performed according to a fraud detection model:
  detecting a first pattern indicative of fraud in a first set of insurance related data belonging to a first carrier; and
  detecting a second pattern indicative of fraud in a second set of insurance related data belonging to a second carrier, wherein the second pattern is associated with a score, wherein the score is used to indicate a confidence that the second pattern is indicative of an occurrence of fraud in the second carrier, and wherein the score is below a validation threshold;
in response to detection of the first pattern indicative of fraud in the first set of insurance related data belonging to the first carrier, increasing the confidence that the second pattern is indicative of the occurrence of fraud in the second carrier at least in part by increasing the score associated with the second pattern;
automatically validating the detected second pattern in response to determining that the increased score associated with the second pattern exceeds the validation threshold;
based at least in part on the validation of the second pattern, initiating collaboration processing, wherein initiating the collaboration processing comprises notifying first and second users associated with the first and second carriers, respectively, of the detected first and second patterns indicative of fraud, and wherein the notifying comprises presenting, to at least one of the first user and the second user, an option to collaborate;
obtaining consent from the first user to share at least a portion of the first set of insurance related data and consent from the second user to share at least a portion of the second set of insurance related data;
causing to be presented to the first user, in a first user interface, at least the portion of the second set of insurance related data that the second user has consented to share, wherein an identity of the second user is withheld in the first user interface from the first user; and
causing to be presented to the second user, in a second user interface, at least the portion of the first set of insurance related data that the first user has consented to share, wherein an identity of the first user is withheld in the second user interface from the second user.

* * * * *